June 22, 1965  E. H. WHITNEY  3,189,948
INTERNALLY HEATED COLD MANIFOLD MOLD
Filed Sept. 14, 1962  2 Sheets-Sheet 1

INVENTOR.
EDGAR H. WHITNEY
BY Kenwood Ross
ATTORNEY.

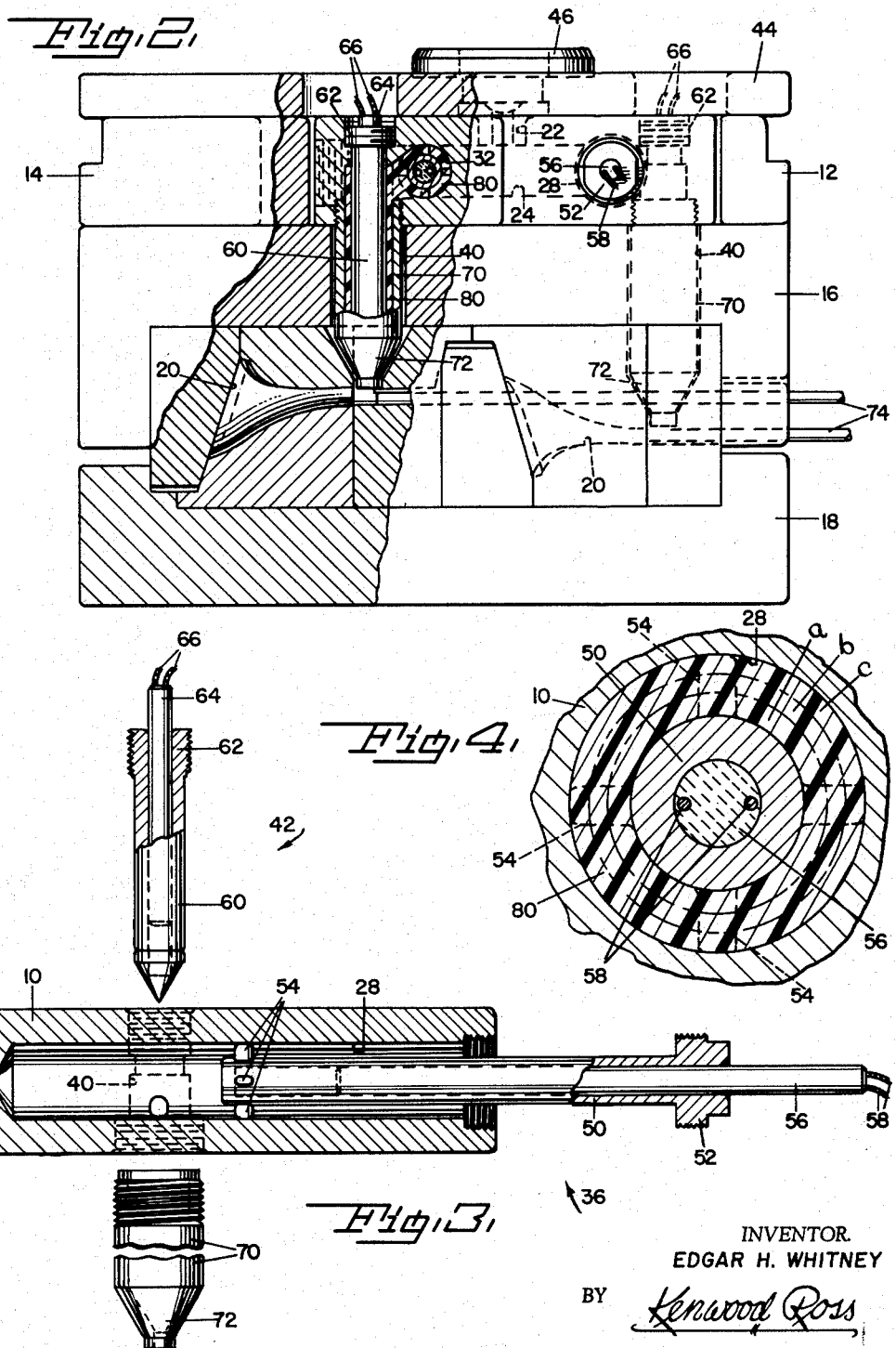

> # United States Patent Office

> 3,189,948
> Patented June 22, 1965

3,189,948
INTERNALLY HEATED COLD MANIFOLD MOLD
Edgar H. Whitney, Dunellon, Fla., assignor to Osley &
Whitney, Inc., Westfield, Mass.
Filed Sept. 14, 1962, Ser. No. 223,652
2 Claims. (Cl. 18—38)

The present invention relates generally to new and useful improvements and structural refinements in an injection molding machine and more particularly in molds or dies therefor including means for heating the thermoplastic derivatives of cellulose and artificial resins delivered thereto and it is directed especially to the provision of such molds or dies incorporating a cold manifold, and to an improvement in a means for internally heating same in such manner that heat may be applied uniformly to a comparatively thin body of the thermoplastic material.

The invention relates primarily to that portion of an injection molding machine whereat the charge, normally a thermoplastic material, is heated to plastic conditions as it is forced therethrough by an injection plunger.

To this end, it has been common practice to provide a spreader (commonly referred to in the art as a "torpedo" or "pineapple") over which the body of molding material is adapted to flow as a relatively thin annular or tubular stream, said molding material being plasticized by heat supplied from the surrounding cylinder and also from within the spreader, the material thus heated and plasticized then being transformed from tubular form so as to flow as a rod-like stream for injection through an injection nozzle into a suitable mold cavity.

Without intending to place undue limitations upon the scope of the invention beyond what may be required by the state of the prior art, the particular embodiment may be briefly described as a system for heating a plastic within a cold manifold, having general utility in the arts.

It will be helpful to an understanding of the invention first to consider briefly some of the more essential and important features and aspects of the prior art and of the present invention, so that same may be kept in mind during subsequent reading of the detailed description of the practical embodiment of my improvements and illustration thereof in the hereunto annexed drawings.

One of the inherent problems connected with the provision of an injection cylinder assembly of the character referred to which has an injection nozzle centrally located at one end is that the heating element in the spreader can only be assembled therein from the shank end, thus requiring a cap or plug or the like to be welded to the spreader shank. In the event of burning out of said element, replacement thereof has been difficult or impossible, and as a result, the operator may elect to use the machine with an unheated spreader in order to save the cost of replacement of the entire spreader and heater assembly, but at the expense of a lengthened molding cycle and an inferior resultant product.

Another difficulty heretofore experienced results from leakage or creeping of material into crevices between axially interfitting surfaces of the spreader and the manifold body whereby such material chars or burns in such crevices so as to contaminate the material flowing therepast. Furthermore, crevices, sharp corners, and the like in the path of flow cause the material to "hang up" thereat, inducing non-uniform flow of the material as well as overheating thereof with consequent decomposition in some instances and burning or charring with resulting contamination.

The existing practice in the trade, as exemplified by the prior art constructions of injection molding machines heretofore known, has been to provide electrically heated melting chambers with the outer surfaces of the manifold being covered with suitably disposed heating bodies, which supply heat to such areas where needed. Melting chambers of this kind are particularly suitable for various materials which are not sensitive to over-heating. The melting chamber has to be designed for considerable pressures, required for the pressing or injecting of the material which is not always uniformly melted and in numerous points remains in a relatively solid state, as no provision is known as yet by which a material which is molten in one place could be withdrawn irrespective of the condition of material in other portions. Moreover, in the known melting chambers, a considerable volume of material, ready for melting, is contained, which fact may easily be a cause of decomposition of such thermoplastic substances which do not withstand a higher temperature for a longer period of time, as is frequently the case for instance in injection molding of articles having a smaller volume than the size of the melting chamber.

It has been suggested to remove such drawbacks by employing steam or hot water heating in which case overheated portions are avoided. Such procedure presents grave difficulties however particularly when working with high temperatures, e.g. above 200° C., in consequence of the high pressures required in such case.

As is well understood, spreader elements are known which are inserted in the manifold in order to assist in effecting a uniform and efficient heating of the plastic material as it passes through the pressure cylinder. To this end, the element is designed so as, in the first place, to provide an additional source of heat and, in the second place, to spread the material and thus render it more susceptible to the heating action both of the element and of the manifold walls.

Also as is understood, the plastic material is normally fed to the manifold by a series of small strokes of one or more pistons or by a single long stroke of a piston. The charge of plastic must then be heated to become substantially uniformly fused for a rapid ejeciton into a die. In practice, it is difficult, if not impossible to heat a large charge without heating some parts of the charge for too long a time or producing an excessive temperature therein. Such over-heating results in premature setting of thermosetting materials or "burning" of true thermoplastics. This has posed a problem which has not been solved heretofore, to my knowledge. With thermosetting materials, the die is heated and imparts considerable heat to the heating cylinder by contact therewith, thus aggravating the problem. It has been proposed to overcome this difficulty by water cooling the injection nozzle of the heating cylinder, but this has been found to be unsatisfactory.

In prior art, it has been known to place heating cartridges on the outside of the manifold wherefore the entire manifold is heated, causing overheating of the material with consequent loss of control thereover and with the further results that excessive expansion and contraction take place in the manifold as it is heated or cooled. In many instances, the expansion is so great that the nozzles leading to the mold cavities are broken or badly distorted, necessitating machine disasembly and replacement of the damaged or broken parts.

With the conventional so-called "hot runners" in these prior art structures, it is not possible to control and maintain different molding temperatures in different parts of the mold, so that overheating and/or underheating have produced vexing problems.

In other instances, heat is transmitted to the structure through the outer wall by electric heating coils mounted on the outside of said wall. In order to achieve a proper heat transmission to the center of the plastic material, ribs are provided in the cylinder bore in such a way that around the center a certain cross section remains unrestricted so as to lower the resistance to flow. However, ribs arranged on the inner wall are difficult to manufacture. Moreover, the material in the unrestricted centrally located cross section is but poorly heated with the result that this low-temperature material mixes, on its travel through the cylinder, with other better heated material located between the ribs. When this mixture with its heterogeneous temperatures is injected through the nozzle, the quality of the moldings is not uniform.

These prior art constructions teach heated chambers, admittedly, but I am also aware of a paucity of suitable instrumentation which has been the stimulus for these improvisations and I am further aware that, until now, no satisfactory construction has been forthcoming which combines in a simple manner the multiplicity of desirable features in a construction of this type.

These prior constructions are thus attended with certain serious disadvantages and limitations which have militated against their more general adaption.

In contradistinction, I have discovered that all of these difficulties and disadvantages are overcome and new advantages accrue when and as the structure of my invention is employed.

I accomplish this by the provision of a device which obviates the aforesaid objectionable inconveniences.

The structure is differentiated from prior structures by numerous specific characteristics which not only differentiate it from prior similar structures but which contribute essentially to its utility.

It is therefore a principal object of the invention to provide an inventively novel and improved construction of the type of injection cylinder which enables thorough plasticization of the charge at lower temperatures and in shorter periods of time whereby to prevent overheating and decomposition and to materially shorten the molding cycle.

And it is another object of the invention to furnish an improvement in the art which, on the basis of the factors involved, is capable of solving the difficulties heretofore presented and of assuring that plastic materials may be heated in an enclosed heating chamber of relatively large area and volume, the pressure being generated in and derived from a material feed and pressure channel in open communication with the heating chamber. The heating chamber leads to and communicates with the mold cavity of the apparatus and the plastic material is carried to the mold cavity under the pressure produced in the feed and pressure channel, the product being formed to the required shape in the mold cavity. For thermosetting materials, the heating in the heating chamber may be sufficiently high in temperature for exothermic reaction to take place, and for the material to cure rapidly even though the mold can be heated, whereby if desired the molded piece may be rapidly ejected from or through the mold cavity to permit final reaction to take place outside the mold.

For further comprehension of the invention, let it be stated that one general object hereof is to provide an improved construction of a spreader element which is designed to offer a minimum resistance to the flow of material through the passages which it forms within the cylinder and at the same time is sufficiently strong to withstand the relatively high pressures, on the order of 30,000 lbs. per square inch, to which it is subjected in the pressure cylinder.

The present improvements, while retaining the advantageous features of previous constructions found in spreaders, provide, in addition, for the better incorporation therein of the necessary heating element and of thermostatic means for controlling such heating element so as to insure the uniform heating of the plastic material as it is injected from the pressure cylinder, and more importantly, I provide a system whereby, in a manifold, the molding temperatures in different portions of the mold may be individually controlled, same being accomplished by a system comprehending a cold manifold having heating means strategically disposed internally thereof, in the sprue channels or runners, with each of the heating means being individually, and independently controlled wherefore complete temperature control is obtained in all sections of the manifold, making the mold effective for use with crystalline thermoplastics.

Another chief object of the present invention is the economic and expeditious production of a manifold assembly including a heating chamber for a plastic material extended under high pressure by an injection molding device, especially of the piston and cylinder type.

The objectional features referred to above as existing in the prior art are here overcome in the design hereof wherein heating elements are individually controlled so as to allow complete temperature control in all sections of the manifold and are strategically located within the runners, with the result that the manifold remains relatively cold at all times wherefore the possibility of great distortion is precluded, it being appreciated that a cold manifold is the desideratum.

The invention possesses other objects and valuable features which are of advantage in other relations. For instance, I comprehend that a certain portion of thermoplastic material within the channels or runners of the manifold is heated to a fluid state while another portion thereof remains in a relatively solid state due to the contact with the cold metal of the manifold. That is, a certain amount of the plastic mass within a runner (say about ½) remains relatively cold adjacent to its outer perimeter for the reason that the plastic mass is internally heated from within wherefore the metal of the manifold takes such heat as is generated away so as to effectuate a tendency of the material to solidify adjacent its outer periphery.

Still a further object hereof is to reduce the length of the runners or sprues so that a more efficient use of the space within a manifold is envisioned, while concomitantly the amount of plastic scrap formed in the said runners or sprues between successive charges is eliminated. By so disposing the heating elements in the runners, I am able to maintain the plastic material in said runners in a molten state at all times, ready for subsequent use on the next machine cycle.

Too, by reducing the length of the runners, I have been able to increase the number of cavities by as much as 30%.

More specific objects of the invention are:

First: to provide a new design for cold manifold molds of the above mentioned type particularly adapted for use with semi-crystalline thermoplastics which will offer a smoothness, ease and precision in assembly, handling and operation with the elimination of the conventional sprue and runners and the consequent problems incident to the handling of rework.

Second: to provide a structure that permits of use with a minimum of need for repair or maintenance on the part of the user.

Third: to provide a construction of the aforedescribed type that will require but little attendance and that, by its large capacity and rapidity and accuracy of action will enable the user of the machine to manufacture the finished articles cheaply and economically, with a minimization, if not complete elimination of the trimming of the molded parts, all resulting in important distinct advantages in positiveness of automated operation and ease of manual control and action under the varying conditions of practical use, and providing an increased utilization of press capacity, an economy of manufacture, a capability of ready assembly and operation, and a reliability of performance.

Another object of the invention is the incorporation of these advantageous results mentioned above in a machine in which a reduction in fill time and a reduction in the time cycle of operation, particularly in the case of thin wall parts, is experienced.

One of the subsidiary objects of the invention is the achievement of these aforesaid desired results by the use of a simple system of the type above indicated.

In addition to the practical advantages which I ascribe hereto, it will be observable that another chief feature of the invention resides in the fact that a more uniform pressure and shrinkage in multi-cavity molds, is experienced.

Preferably, though not obligatorily, the invention envisions, as another objective, a response to a survey of the industry which has suggested that a most important consideration is temperature control. The mold design which I have developed embodies controls on each major section of the manifold as well as on each nozzle, along with powerstats for effectuating a temperature control and longer heating cartridge life.

To make the manufacture of manifolds a more profitable undertaking, the mechanism embodying the essence of the invention has been engineered in manner as to be simple in its construction, thus expediting economical large-scale production and assembly, the usual complexity of components having been so greatly reduced as to offer a compact design representative of a fundamentally new concept in the combining and coacting of interrelated parts.

Precision of relative dimensioning of parts as militates against inexpensive manufacture, simplicity of maintenance and care, and consistency of performance in practical use have been assiduously borne in mind in the development of the present invention.

Too, I provide a manifold of the above-mentioned character in which ruggedness and durability of construction are combined with simplicity and ease of use and protection against usual but hard conditions of practical use resulting in an apparatus which effectively meets the normal requirements therefor and performs its functions in a practical and dependable manner.

Further, while the components are uniquely compact, they are nevertheless readily accessible for maintenance and replacement purposes with a consequent reduction in maintenance costs over related devices heretofore known.

Other of the chief objects and purposes hereof are to provide advantageous structural and operational features in a device of the class to which reference has been made so as to offer an apparatus having the following inherent meritorious characteristics: first, engineeringwise, a uniqueness in design of coating parts whereof the components are coordinated for facile assembly and, when once assembled, are positively and securely retained in operative relationship so as to be not readily separable from each other, accidentally or otherwise; second, a susceptibility to easy installation; third, a high degree of safety in its use; fourth, a high degree of efficiency and dependability in its operational use; fifth, the securement of a higher degree of accuracy and greater degree of variety in the manner of work performed therewith than has heretofore been possible with prior devices known in the art; sixth, the attainment of a convenience of arrangement of parts and a flexibility or a capability of adjustment by which a large variety of work can be produced by means of the same device; seventh, the provision of a construction which is well adapted to withstand the usage to which a manifold is odinarily subjected, and eighth, the provision of such other improvements in and relating to manifolds of the type above referred to as are hereinafter described and claimed.

Further objects are to provide a manifold conformable to the desiderata of the preceding paragraph and offering specific improvements in its various operating instrumentalities, which themselves are minimum in number, so that it is simple and compact in accordance with the demands and desires of manufacturers and purchasers alike and so as to provide distinct advantages in that it is distinctive in its appearance, practical in its value, durable in its organization, reliable in its operation, and efficient in its use.

These foregoing objects and other incidental ends and advantages characterize the device of the present invention, and distinguish it from previously known devices of a kindred nature.

The objects of the invention are susceptible of attainment by use of constructions different in certain respects from that disclosed, such as minor changes and variations in dimensions, shape, form, cooperation of material and/or type of subassembly and accessory, all without departing from the underlying principles, salient features, scope and spirit thereof.

While all of these objects are attainable in the preferred and disclosed embodiment, it is to be understood that, by utilizing the invention only in certain of its aspects, certain of the objects may be attained individually or in sub-groups without necessarily attaining all of the objects. That is, while the advantages of the invention as here outlined are best realized when all of its features and instrumentalities are combined, useful embodiments may be produced involving less than the whole.

To the end of attaining these objects and advantages and others hereinafter reasonably appearing, it will be explained that the invention consists substantially in the particular construction, configuration, dispostiion, relationship, combination and function of the organization of coacting elements, components and instrumentalities of a manifold as exemplified in the following detailed disclosure wherein the aforestated objects will be in part obvious and apparent and will be in part more fully pointed out.

It will be apparent, however, that the specific physical embodiment delineated, albeit the preferred exemplification, is only indicative of but one of the multiplicity of ways in and purposes for which the principles, of the invention may be employed. The invention reverted to is not restricted or confined to said embodiment and is not intended to be exhaustive of, nor limiting of, the spirit or scope hereof. On the contrary, it is merely exemplary and explanatory and is submitted as a best known structural embodiment for the purpose of illustrating the invention, in accordance with the patent statutes that others skilled in the art to which the invention pertains, may so fully understand the invention, its principles and the application thereof, that they may embody it and adapt it in numerous forms, each as may be best suited to the conditions and requirements of any particular use. The disclosure is given with a view to illustrating and explaining the details of construction and arrangement of parts and the precise nature of the principles of the invention and their embodiment for practical use.

The precise construction of the figures of the drawings need not be slavishly followed as, of course, the manifold may have to be mechanically varied or alternatively constructed or modified in accordance with any specific use contemplated therefor. Such adaptations and/or alternative constructions and/or modifications are intended to be comprehended within the meaning and purview and range of equivalence of the below subjoined claims, there being no intent to have this invention limited to or circumscribed by any specific details.

Many other advantages, features and additional objects of the present invention will become manifest to those versed in the art upon making reference to the following detailed description forming a part of this specification, when read in conjunction with the illustrations in the accompanying sheets of drawings, and the characteristic features which I consider to be novel herewith, as to its construction and organization and as to its methods of manufacture and operation, will be better understood from a consideration thereof.

To enable others skilled in the art so fully to comprehend the underlying features hereof that they may embody the same in the various ways contemplated by this invention, drawings depicting a preferred typical construction have been annexed as parts of this disclosure, and in such drawings, like characters of reference denote corresponding parts through all the views of which:

FIG. 2 is an end elevational view, taken from the right as seen in FIG. 1, with portions of the manifold having been broken away for purposes of clarity;

FIG. 3 is a fragmentary exploded elevational view of the heating means of the invention; and FIG. 4 is a greatly enlarged, somewhat diagrammatic, sectional view taken through one of the heating means of the invention.

Figure 1:
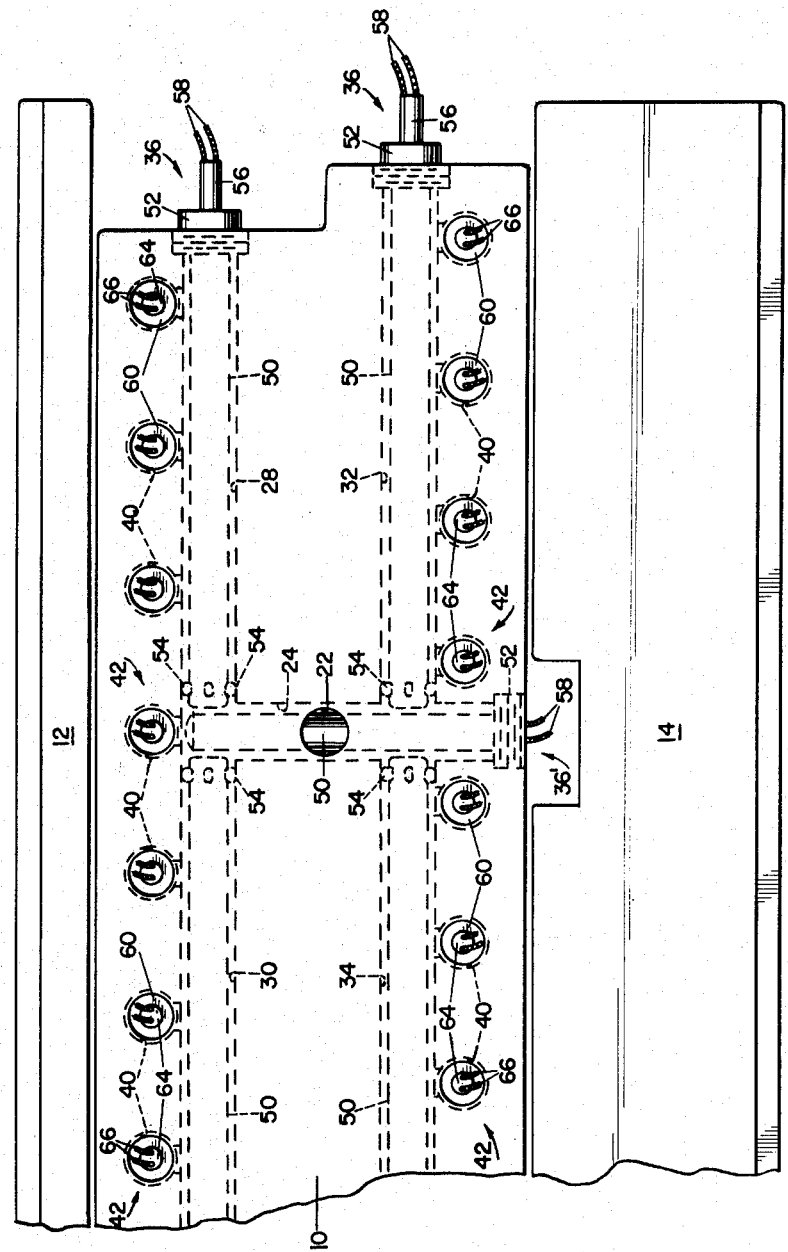
FIG. 1 is a fragmentary top plan view of the internally heated cold manifold of the invention, with the top plate removed.

In this description and appended claims, various components and details thereof will be identified by specific names for purposes of convenience. Although specific terms and expressions are employed for purposes of identifying various components, they are used in a generic and descriptive sense only, and are intended to be as generic in their application as the art will permit. The phraseology or terminology employed is not for the purpose of limitation and it is not intended to exclude any reasonable equivalents of the features shown and described or portions thereof.

With continued reference now to the drawings, I have shown, in FIG. 1, a preferred embodiment of the apparatus constructed in accordance with the teachings of the invention in order that the general relation and utility of the manifold may be better understood.

I have shown in said FIG. 1, a manifold 10, with the top plate thereof removed, for purposes of clarity. Same is of a type and construction suitable for incorporation in any conventional injection molding machine.

Manifold 10 is disposed between a pair of spaced, parallel, longitudinally-extending supports 12 and 14, which, in turn, rest upon and are supported by an upper mold section 16 (see FIG. 2) which functions in cooperative relationship with a lower mold section 18, in known manner, with the upper and lower mold sections 16 and 18 being so interrelated that the body is transversely divided along a plane so that the sections are partible to permit the ready insertion thereinto and removal therefrom of operating components, as occasion may require, and of course, the ejection of molded pieces therefrom as by a standard or conventional instrumentality, such as a movable ram. Also, as known, the mold sections 16 and 18 define therebetween a plurality of mold cavities 20.

In the embodiment shown, such a cavity is depicted in the shape of a heel of a lady's shoe, but it will be understood that same is shown for purposes of illustration only, the mold hereof being adapted to fabricate thermoplastic articles of a variety of sizes and shapes.

Said manifold 10 is additionally provided with a vertically-disposed inlet 22 located centrally of its upper planar surface, which inlet is continuous with and communicates with a horizontally-disposed transversely-extending material feed and pressure channel 24 formed within said manifold 10 downwardly of said upper planar surface.

A pair of horizontally-disposed, longitudinally-extending, axially-aligned oppositely-facing material feed and pressure channels 28 and 30 lead from and communicate with material feed and pressure channel 24, adjacent one end thereof, and a pair of horizontally-disposed, longitudinally-extending axially-aligned oppositely-facing material feed and pressure channels 32 and 34 lead from and communicate with material feed and pressure channel 24, adjacent the opposite end thereof.

Stated otherwise, material feed and pressure channels 28 and 32 are disposed in coplanar relationship with channel 24 at one side of inlet 22, and material feed and pressure channels 30 and 34 are disposed in coplanar relationship with channel 24 at the other side of inlet 22.

A plurality of spaced, vertically-extending material feed and pressure channels 40 extend through manifold 10 and the upper mold section 16 disposed therebelow, and are each disposed adjacent and in communication with one of the horizontal channels 24, 28, 30, 32, or 34.

Each channel 40 communicates with a mold cavity 20 defined between the sections 16 and 18.

As shown in FIG. 2, a top plate 44 surmounts manifold 10 in a manner wherefore its opposite sides are seated upon supports 12 and 14, and an inlet funnel 46, extending through said top plate 44, is concentrically related with and communicates with inlet 22 in the manifold.

The plastic material being operated on may be ejected under pressure of a reciprocating plunger or the like and delivered in a series of successive charges through inlet funnel 46 and inlet 22 to material feed and pressure channel 24 and thence to each of the channels 28, 30, 32 and 34, and thence through each of the respective vertically-disposed channels 40, and therefrom into the respective mold cavity 20.

It will be understood and appreciated that the plastic material flowable therethrough comprehends thermoplastic material containing a derivative of cellulose, such as the organic derivatives of cellulose, which may be an organic acid ester of cellulose, a cellulose ether, a mixed ester of cellulose or a mixed ester-ether of cellulose. Examples of organic esters of cellulose are cellulose acetate, cellulose format cellulose propionate and cellulose butyrate, while examples of cellulose ethers are methyl cellulose, ethyl cellulose and benzyl cellulose. Examples of mixed esters of cellulose are cellulose nitro-acetate and cellulose acetate-propionate, while examples of mixed ester-ethers of cellulose are benzyl cellulose acetate and methyl cellulose acetate. Mixtures of any of the above derivatives of cellulose may also be employed herein.

The walls of the manifold are made relatively heavy such that there is no tendency for the walls to expand and form fissures in the inner wall or conduit due to the extreme pressure from within or to buck from the stresses applied at the nozzle tips. Such fissures are formed unless the walls are relatively thick and these fissures tend to hold for a period of time material which would otherwise flow readily on through the mold. The material held in the fissures tends to decompose and corroded material may pass on into the mold, thus contaminating the article. The corroded material also tends to gradually enlarge the fissure until the assembly explodes at that part. Furthermore, the material held for a period of time in a fissure becomes overheated and in the molded article forms a brittle spot.

A heating element 36 is disposed in each of the aforementioned channels 28, 30, 32 and 34 and a heating element 36' is disposed in channel 22. Similarly, each channel 40 has a heating element 42 disposed therein, with all heating elements cooperatively functioning to maintain the plastic material in the desired molten or flowable state over a certain area thereof.

Said heating elements form a network which is connected to a central control panel (not shown), inclusive of powerstats or the like, whereby the heating of each said heating element may be individually controlled.

The heating elements 36 are identical in configuration and each comprises an outer cylindrical shank portion 50, the outer diameter of which is smaller than the diameter of the respective channel in which it is receivable and a head portion 52 of increased diameter adjacent one end thereof. Said head portion has an outermost threaded annular portion and is of substantially the same diameter as its respective channel so as to be threadedly fitted therewithin. At the opposite end of the heating element, a plurality of radially outwardly-extending lugs or ribs or projections 54 are provided in order to retain such end and shank portions as a whole in proper concentric relation to its chanel. The end surfaces of the lugs or ribs and the inner wall surface of the channel are ground so as to form a fluid-tight metal-to-metal joint thereat, as to accurately locate the shank of the element 36 centrally within the bore. As apparent, said ribs alternatively may be provided on the inner wall of the bore.

As is common, the inner end of the heating element may be of bullet shape or prolate form.

A removable electrical heating unit in the form of a cylindrical cartridge 56 of any one of a number of well-known commercially available types is insertable into the core of the shank portion 50 so as to be snugly and replaceably receivable therein.

The shank portion 50 known in the trade as a "torpedo," with the cartridge 56 disposed therein, as in turn insertable into its respective channel 28, 30, 32, or 34. For purposes of illustration only, shank portion 50 is shown as being associated with channel 28, in FIG. 3.

As aforesaid, the shank portion 50 is of a smaller diameter than that of the channel 28 in order that the plastic material may flow therearound and within the channel.

The heating cartridges 56 hereof have longitudinally-extending lead wires 58 imbedded therein and extending outwardly from an end thereof, said lead wires being suitably connected to a powerstat provided in a suitable control panel (not shown) wherefore the electric current supplied to the heating unit may be automatically varied so that the discharged material will be at the right temperature for the molding operation.

The construction of the elements 36, furthermore, is such that access may be readily had to such heating cartridges 56 without removing the entire element from the manifold, all whereby repair and maintenance of the elements is facilitated.

Heating element 36', disposed in channel 24, is identical in all respects with the elements 36, with the exception that the ribs or projections 54 have been omitted from the innermost end of shank portion 50. Channel 24, having a relatively short run, and heating element 36', consequently, being of relatively short length, the support provided by the projections 54 is not required in the case of element 36'.

The heating elements 42 disposed within the vertical channels 40 differ somewhat in construction from that described with reference to the heating elements 36 and 36', and are associated with nozzle means for directing the plastic material disposed in channels 40 into the mold cavities 20.

As shown in FIGS. 2 and 3, each heating element 42 comprises a shank portion "torpedo" 60 provided with a threaded shoulder 62 at one end and having disposed therein a heating cartridge 64, carrying heating wires 66. The heating wires 66 of each cartridge are connected to a powerstat for heat control purposes, as previously described.

The free end of the torpedo 60 is receivable in the bore of a shell or nozzle 70 threaded in the channel 40 and having a spout 72 opening into one of the cavities 20.

Ejector pins 74 extend transversely through appropriate openings provided in the mold 16 for the purpose of ejecting the finished part from the mold cavity in known-manner.

The ejector pins will preferably be linked so as to be operable simultaneously by suitable power means. Same not forming any part of the present invention, further discussion thereof will not be made.

With particular reference to FIG. 4, plastic material 80 is shown for purposes of illustration, as flowing in a molten state immediately adjacent heating element 36 disposed in channel 28. This area of molten plastic is designated by the letter *a* in FIG. 4. However, in that area of the plastic material removed from contact with the heating element, the plastic material is less fluid, being at a lower temperature. This area is designated by the letter *b* in FIG. 4. Finally, that portion of the plastic material which is in contact with the relatively cold wall of channel 28 approaches the solid state. This area is designated by the letter *c*.

This same phenomenon will occur in the channels 40, with the shell or nozzle 70 of heating elements 42 being in contact with the relatively cold wall of the manifold wherefore the plastic material adjacent thereto is cooled to an almost solid state.

It will, of course, be appreciated that the several areas within the plastic material are not as sharply defined as shown in FIG. 4, such being for purposes of illustration only.

The material will, in fact, gradually go from a fluid state adjacent the heating means, to an almost solid state adjacent the relatively cold manifold.

Experience has shown that the lowest melting point of most thermoplastic materials is approximately 400°. The temperature of the plastic is approximately 125°, wherefore it is actually in a solid state.

Thus, the manifold remains cold at all times wherefore the possibility of distortion therein due to constant expansion and contraction is obviated, and the possibility of damage to the nozzles is greatly diminished.

The flow of the plastic material 80, in the mold hereof, will be through the inlet funnel 46 and the inlet opening 22 and into the channels 24, 28, 30, 32 and 34 where it is heated by the heating elements 36' and 36, respectively (it being understood that the plastic material is disposed between the shank portion or "torpedo" of the heating element and the wall of the channel and flows between the ribs 54 of the shank portion in the case of elements 36), and into the vertical runners 40, where it is heated by the heating elements 42 and fed into the cavities 20 by the nozzles 70.

From the above, it will be apparent that the plastic material is heated at all times after it enters the mold, and at no time is it allowed to solidify completely.

By this means, the problem of excess scrap occasioned by solidified plastic material in long sprue channels is solved.

By means of the novel system and constructions hereof, there is virtually no scrap, resulting in tremendous savings in down time required to remove the solidified material from the runners for reclaiming by being reground, etc.

Other modes of applying the principle of my invention may be employed instead of the one explained, change being made as regards the mechanism herein disclosed, provided the means stated by any of the following claims or the equivalent of such stated means be employed.

It is believed that the gist of the invention will be clearly understood from the foregoing disclosure and accordingly, further analysis thereof at this point is considered unnecessary, as I have, in accordance with the provisions of the patent statutes, described the construction and principle of operation of my invention together with the apparatus which I believe to represent the best embodiment thereof, to the end that others can, by applying current knowledge, readily adapt it for various applications without omitting features which, from the standpoint of prior art, fairly constitute essential characteristics of its generic and/or specific aspects. The substitution of equivalents and other changes, modifications and alterations as circumstances may suggest or render expedient, are reasonably contemplated, the invention being susceptible of such without departing from its real spirit or underlying principles.

The claims are desired to include within the scope thereof all of said suitable variations, modifications and equivalents by which substantially the results of the invention may be obtained, through the use of substantially the same or equivalent devices or means. Accordingly, limitation hereof should only be made as determined by a proper interpretation of the prior art and the scope of the subjoined claims, in which it is my intention to claim all novelty inherent herein as broadly as possible.

I therefore particularly point out and distinctly claim as my invention:

1. In a mold having partible mold sections defining a plurality of cavities therebetween for receipt of thermoplastic material therein, an internally heated cold manifold mounted on one of the mold sections and having horizontally-extending and vertically-extending interconnecting channels in said manifold forming an interconnected network, the vertically-extending channel being offset relative to the respective interconnected horizontally-extending channel, an inlet opening in said manifold communicating with at least one of said channels, heating elements extending into each of said channels from the mold exterior, the heating elements disposed in said horizontally-extending channels comprising a heating cartridge sleeved by a metal sheath threadedly engaged in said channels and having a plurality of radial ribs embracing the walls of said channels, nozzles in said vertically-disposed channels opening into said cavities, the heating elements disposed in said vertically-extending channels comprising a heating cartridge sleeved by a metal sheath threadedly engaged at one end in one of said channels and sleeved at its opposite end by one of said nozzles, and temperature control means for each of said heating elements whereby the temperature of the thermoplastic material in the cavities of the mold and in said channels of the manifold may be individually controlled.

2. In a mold having partible mold sections defining a plurality of cavities therebetween for receipt of thermoplastic material therein, the combination of, an internally-heated cold manifold mounted on one of the partible mold sections and having horizontally-extending and vertically-extending interconnecting channels forming an interconnected network, the vertically-extending channels being offset from the respective interconnecting horizontally-extending channels, an inlet opening in said manifold communicating with at least one of the interconnecting channels, a heating element extending into each of the interconnecting channels from the mold exterior, the heating element disposed in each horizontally-extending channel comprising a heating cartridge sleeved by a metal sheath threadedly engaged in the respective channel and having a plurality of radial ribs embracing the walls of the respective channel, a nozzle disposed in each vertically-disposed channel and opening into one of the cavities, the heating element disposed in each vertically-extending channel comprising a heating cartridge sleeved by a metal sheath threadedly engaged at one end in the respective channel and sleeved at its opposite end by the respective said nozzle, and a temperature control means for each said heating element whereby the temperature of the thermoplastic material in the cavities of the mold and in the interconnecting channels of said manifold may be individually controlled.

References Cited by the Examiner
UNITED STATES PATENTS

| | | | |
|---|---|---|---|
| 2,436,869 | 3/48 | Lester | 18—30 |
| 2,865,050 | 12/58 | Strauss | 18—30 |
| 3,010,155 | 11/61 | Gilmore | 18—30 |
| 3,050,779 | 8/62 | Farley | 18—30 |
| 3,093,865 | 6/63 | Peters et al. | 18—42 |

J. SPENCER OVERHOLSER, *Primary Examiner.*

MICHAEL V. BRINDISI, *Examiner.*